United States Patent [19]
Howell

[11] Patent Number: 5,429,463
[45] Date of Patent: Jul. 4, 1995

[54] LOAD BINDER HAVING REMOVABLE HANDLE

[76] Inventor: John Howell, Rte. 1, Box 217, Taft, Tenn. 38488

[21] Appl. No.: 135,976

[22] Filed: Oct. 14, 1993

[51] Int. Cl.⁶ .......................... B65F 1/00; G05G 1/04
[52] U.S. Cl. .................................. 410/156; 74/544; 16/114 R; 24/68 CT; 81/177.2; 403/18
[58] Field of Search .................. 410/34, 36, 37, 50, 410/97, 99, 100, 103, 106, 156; 16/114 R, DIG. 24, DIG. 25; 7/168; 254/DIG. 3; 24/68 CT, 68 CD, 71 TD, 270; 74/543, 544, 524; 81/177.1, 177.2, 489; 403/17, 18

[56] References Cited

U.S. PATENT DOCUMENTS

| | | | |
|---|---|---|---|
| 440,435 | 11/1890 | Oneill et al. | 81/177.2 X |
| 1,829,467 | 10/1931 | Atkinson | 16/114 R |
| 2,298,710 | 10/1942 | MacKay . | |
| 2,628,397 | 2/1953 | Olson | 410/106 X |
| 2,824,717 | 2/1958 | Yeager | 24/68 CT X |
| 2,947,514 | 8/1960 | Goss | 410/37 X |
| 3,119,278 | 1/1964 | Simpson | 74/544 X |
| 3,657,944 | 4/1972 | Able | 16/114 R X |
| 3,843,981 | 10/1974 | Verest | 74/544 X |
| 3,988,005 | 10/1976 | Mooney et al. | 410/97 X |
| 4,058,291 | 11/1977 | Schreyer . | |
| 4,488,707 | 12/1984 | Mosley et al. | 410/100 X |
| 4,512,062 | 4/1985 | Crook . | |
| 4,756,181 | 7/1988 | Appelgren | 81/177.2 X |

FOREIGN PATENT DOCUMENTS 758744 5/1967 Canada ........................ 24/68 CT Primary Examiner—Michael S. Huppert
Assistant Examiner—Stephen Gordon
Attorney, Agent, or Firm—Brady, O'Boyle & Gates

[57] ABSTRACT

A removable handle for an operating lever of a load chain binder of the type having a toggle linkage wherein the handle is detachably connected to the operating lever for pivoting the toggle linkage in one direction over-center to tension the chain, and in the opposite direction over-center to release the chain. The handle is automatically released from the operating lever when pivoting the toggle linkage in the direction to release the tension from the load chain to prevent injury to the person operating the handle.

2 Claims, 2 Drawing Sheets

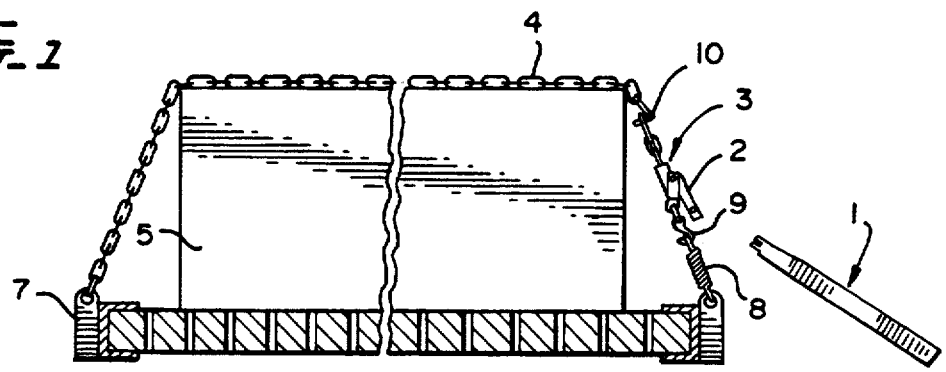
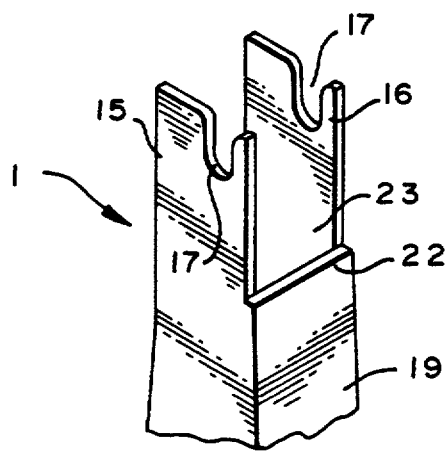
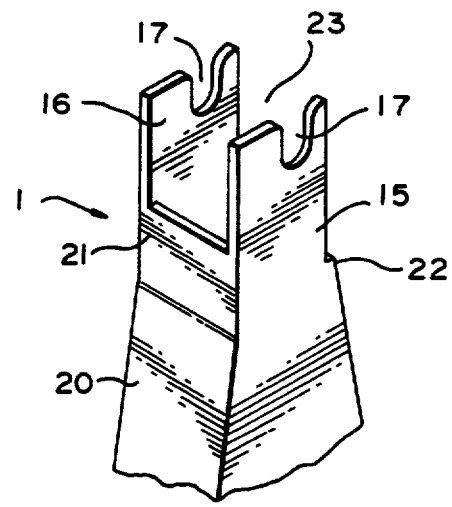
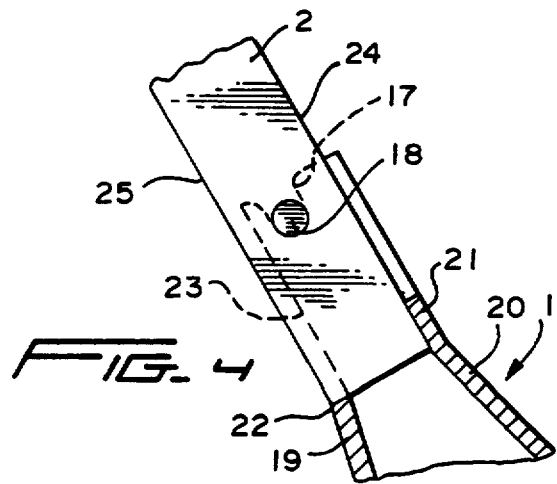
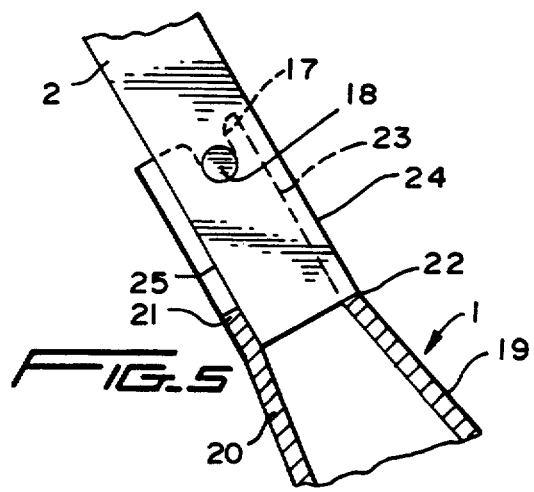

5,429,463

LOAD BINDER HAVING REMOVABLE HANDLE

BACKGROUND OF THE INVENTION

Chains are frequently employed for binding loads, such as, boxes, crates, logs, pipes and the like on trucks wherein one end of the chain is connected to one side of the truck, and the opposite end of the chain is connected to the opposite side of the truck. The chain extends over the load being transported and in order that the load can be bound or held tightly, the chain is provided with a binder or toggle linkage for applying tension to the chain to prevent the load from shifting on the truck. Load binders of this type are disclosed in U.S. Pat. Nos. 2,298,710 and 4,512,062. These toggle linkage binders are characterized by an operating lever operatively connected to the pivotally connected arms of a toggle linkage for pivoting the linkage arms in one direction over center, to thereby move the toggle linkage and associated chain to a tension position; or for pivoting the linkage arms in the opposite direction over center to move the linkage and associated chain to a released position. Handles are usually provided for connection to the operating lever to facilitate actuation of the toggle linkage. While actuating the toggle linkage to tension the chain posed no problems; when actuating the toggle linkage to release the tension on the chain, the operating lever pivots rapidly once it reaches the over-center position, causing a rapid movement of the handle resulting in injury to the person operating the handle. In order to prevent such injury to the operating person, it has been proposed to provide a handle which is detachably connected to the operating lever of the binder so that the operating lever of the binder will swing free of the handle when being pivoted to the released position.

The handle of the present invention is an improvement over prior handles employed for actuating the operating lever of a load binder in that the handle is constructed and arranged to be detachably connected to the operating lever of a chain binder to facilitate actuating the operating lever to tension the binder and to release the binder. When tensioning and releasing the binder, the operating lever automatically detaches itself from the handle when it reaches the over-center position, to thereby prevent injury to the person manipulating the handle and associated operating lever.

SUMMARY OF THE INVENTION

The handle of the present invention comprises, essentially, a tubular member having a pair of slots in one end thereof for engagement with a pair of oppositely extending pins mounted on the operating lever of a toggle linkage chain binder. The tubular member is provided with a wall portion and an opposite open face at the slotted end thereof, whereby when swinging the operating lever to the released position, the operating lever will reach a point at the over-center position when the end of the operating lever will pass through the open face of the handle, to thereby detach the handle from the operating lever.

BRIEF DESCRIPTION OF THE DRAWINGS

FIG. 1 is an end elevational view of a chain binding a load on a load support, and including a chain toggle binder assembly, and the handle of the present invention for actuating the toggle assembly;

FIG. 2 is a fragmentary, perspective view showing the end of the handle on one side thereof;

FIG. 3 is a fragmentary, perspective view showing the end of the handle on the side opposite from that shown in FIG. 2;

FIG. 4 is a fragmentary, side elevational view, partly in section, showing the orientation of the end of the handle when used for actuating the toggle assembly to tighten the chain;

FIG. 5 is a fragmentary, side elevational view, partly in section, showing the orientation of the end of the handle when used for actuating the toggle assembly to release the chain;

DESCRIPTION OF THE PREFERRED EMBODIMENT

Figure 6:
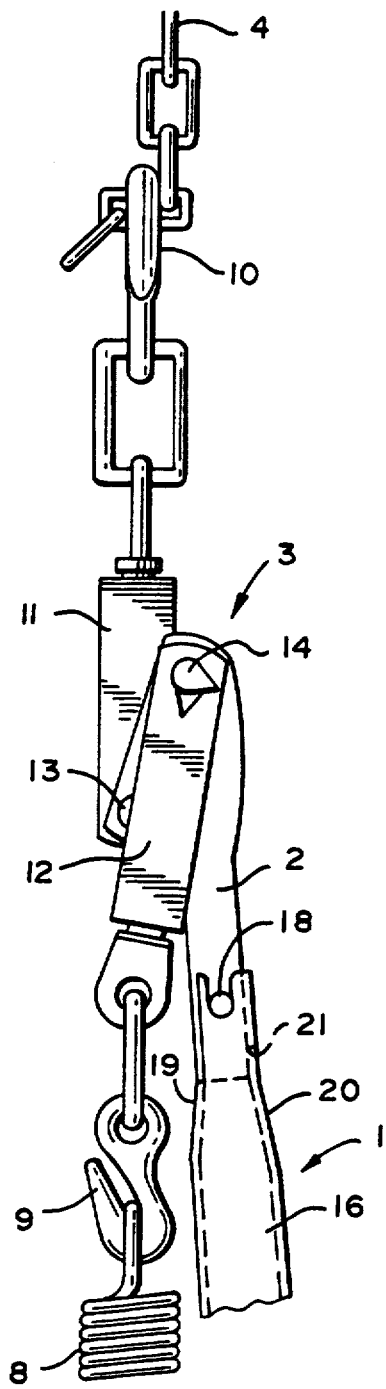
FIG. 6 is a fragmentary side elevational view of the binder chain and associated toggle assembly showing the handle of the present invention connected to the toggle assembly for tightening the chain.

Referring to the drawings and more particularly to FIG. 1, the handle 1 of the present invention is adapted for manipulating the operating lever 2 of a toggle linkage type binder 3 for tensioning a chain 4 for holding a load 5, such as a box or crate, on a load support, such as a bed of a truck. The chain 4 is connected to one side of the truck as at 7 and to the other side by a tension spring 8 connected to one end of the binder by a hook 9, the opposite end of the binder being hooked as at 10 to the free end of the chain 4.

Figure 7:
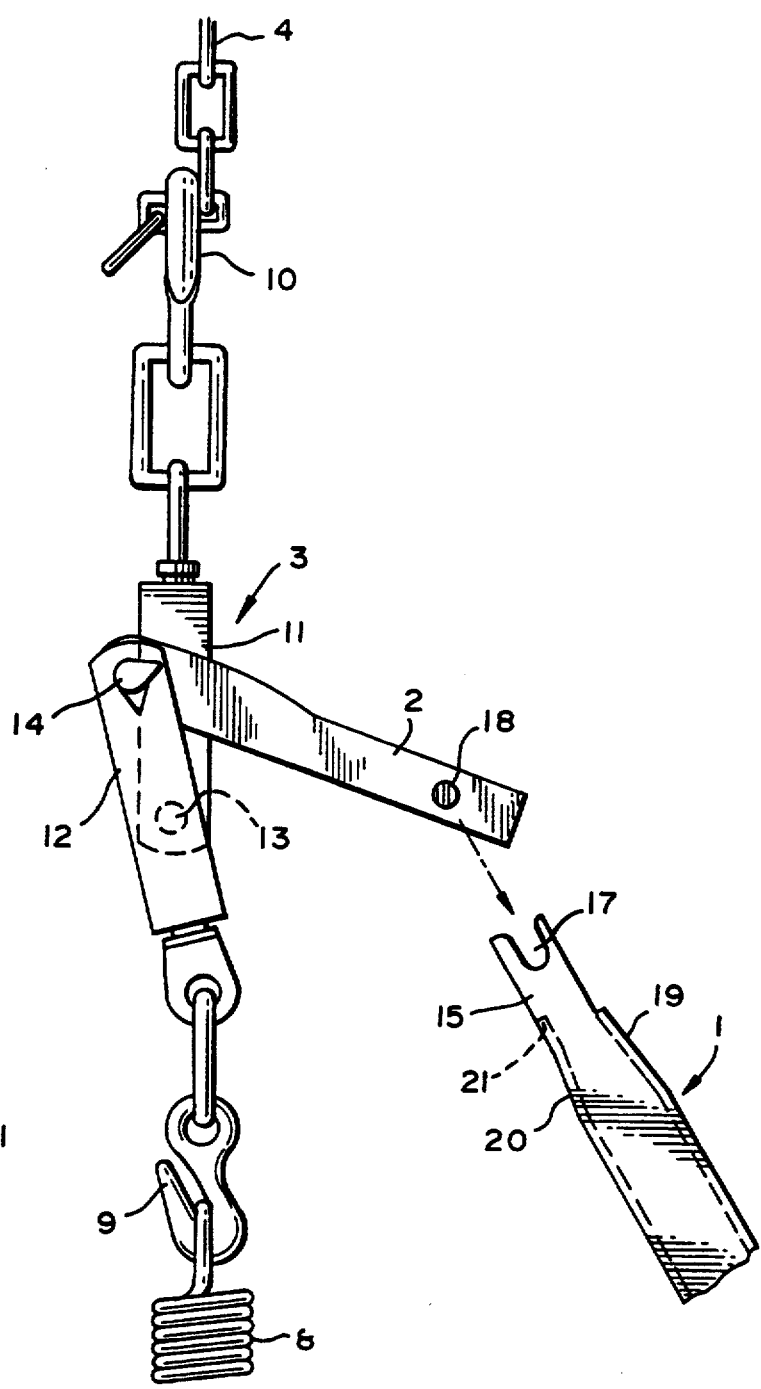
FIG. 7 is a fragmentary side elevational view of the binder chain and associated toggle assembly showing the handle of the present invention after it has manipulated the toggle assembly to the released position.

The details of the construction of the toggle linkage binder are illustrated in FIGS. 6 and 7 which is similar to the load binder disclosed in the above-mentioned U.S. Pat. No. 2,298,710, and comprises an inner yoke 11 and an outer yoke 12 pivotally connected to the operating lever 2 by an inner pin 13 and an outer pin 14. By this construction and arrangement, an over-center type toggle linkage is provided, whereby when the outer yoke 12 is positioned on one side of the center line of the inner yoke 11, as shown in FIG. 6, the binder is in the tensioned position, and when the outer yoke is positioned on the other side of the center line of the inner yoke, as shown in FIG. 7, the binder is in the released position.

The details of the construction of the handle 1 for actuating the operating lever 2 of the toggle linkage binder 3 are shown in FIGS. 2 to 5, wherein it will be seen that the handle 1 is of tubular construction having a substantially rectangular cross-sectional configuration. The handle is open-ended and has a pair of spaced side walls 15 and 16 provided with aligned notches or slots 17 adapted to receive oppositely extending pins 18 integral with the operating lever 2. A front wall 19 and a back wall 20 are integral with the side walls 15 and 16, and the back wall 20 is provided with an end portion 21 which extends further upwardly into the space between the side walls 15 and 16 than the end portion 22 of the front wall 19, whereby the front wall is provided with an open face 23.

The operating lever 2 of the binder 3 is of tubular construction and having a rectangular cross-sectional configuration similar to the handle 1 but dimensioned to receive the slotted end of the handle 1, as shown in FIGS. 4 and 5.

In use, to actuate the operating lever 2 of the binder 3, to tighten the chain 4 around the load 5, the handle is oriented to the position shown in FIG. 4 wherein the end portion 21 of the back wall 20 engages the top wall 24 of the operating lever 2 and the lever pins 18 are inserted into the slots 17. The handle 1 and associated operating lever 2 are then pivoted in a clockwise direction, thereby pivoting the toggle linkage to a position shown in FIG. 6, whereby the chain 4 is tightened, and the operating lever 2 is freely passable through the open face 23 of the handle 1 and the slotted end of the handle 1 becomes detached from the operating lever pins 18.

To release the tension from the chain 4, the handle is oriented to the position shown in FIG. 5 wherein the end portion 21 of the back wall 20 engages the bottom wall 25 of the operating lever 2, and the lever pins 18 are inserted into the slots 17. The handle 1 and associated operating lever 2 are then pivoted in a counter-clockwise direction so that the toggle linkage is rapidly pivoted to the over-center position shown in FIG. 7, wherein the operating lever 2 is freely passable through the open face 23 of the handle 1 and the slotted end of the handle 1 becomes detached from the operating lever pins 18.

By this construction and arrangement, the handle 1 becomes automatically disconnected from the binder operating lever 2 when tension is being released from the load chain 4, whereby injury to the person manipulating the handle 1 is avoided. The pins 18 can be shear pins to prevent breakage of the chain 4 if an excessive force is applied to the operating lever 2.

It is to be understood that the form of the invention herewith shown and described is to be taken as a preferred example of the same, and that various changed in the shape, size and arrangement of parts may be resorted to, without departing from the spirit of the invention or scope of the subjoined claims.

I claim:

1. In combination, a removable handle for a load chain binder of the type having an operating lever connected to a pivotal yoke arm in an over-center toggle linkage assembly wherein the handle comprises, a tubular member having an open end, a pair of aligned slots provided in opposite wall portions having edges at the open end of said handle, said slots extending through the edges of said opposite wall portions, an extended wall portion and an open face provided in opposite wall portions at the open end of said handle oriented 90° from said first-mentioned wall portions, the wall portion containing the extended wall portion having a length greater than the opposite wall portion containing the open face, oppositely extending pins connected to said operating lever and receivable into the slots at the open end of said handle, said operating lever having an upper wall and lower wall, whereby when the operating lever is to be manipulated, the open end of the tubular member is slipped over the operating lever and the oppositely extending pins are inserted into the slots, the extended wall portion engaging the upper wall of the operating lever when the operating lever is being manipulated to tighten the chain binder; the extended wall portion engaging the bottom wall of the operating lever when the operating lever is being manipulated to release the chain binder, whereby the operating lever passes through the open face of the tubular member when the toggle linkage approaches the over-center position, to thereby automatically detach the handle from the operating lever to prevent injury to the person operating the handle.

2. A removable handle according to claim 1, wherein the operating lever and tubular member are rectangular in cross-section.

* * * * *